(12) United States Patent
Arase

(10) Patent No.: US 12,097,980 B1
(45) Date of Patent: Sep. 24, 2024

(54) ENGINE DEVICE FOR UNMANNED FLYING APPARATUS

(71) Applicant: ARASE AIZAWA AEROSPATIALE LLC, Hamamatsu (JP)

(72) Inventor: Kunio Arase, Hamamatsu (JP)

(73) Assignee: ARASE AIZAWA AEROSPATIALE LLC, Hamamatsu (JP)

( * ) Notice: Subject to any disclaimer, the term of this patent is extended or adjusted under 35 U.S.C. 154(b) by 0 days.

(21) Appl. No.: 17/997,581

(22) PCT Filed: May 6, 2022

(86) PCT No.: PCT/JP2022/019566
§ 371 (c)(1),
(2) Date: Oct. 31, 2022

(87) PCT Pub. No.: WO2022/234858
PCT Pub. Date: Nov. 10, 2022

(30) Foreign Application Priority Data

May 7, 2021 (JP) .................................. 2021-079355

(51) Int. Cl.
*B64U 50/20* (2023.01)
*B64D 27/04* (2006.01)
(Continued)

(52) U.S. Cl.
CPC ............. *B64U 50/20* (2023.01); *B64D 27/04* (2013.01); *B64U 50/11* (2023.01); *F01L 1/026* (2013.01);
(Continued)

(58) Field of Classification Search
CPC ........ B64D 27/04; B64U 50/11; B64U 50/20; F01L 1/047; F01N 13/10; F01N 2340/04; F01N 2590/00; F02B 75/24
(Continued)

(56) References Cited

U.S. PATENT DOCUMENTS

| 4,938,175 A | 7/1990 | Matta |
| 2020/0263602 A1* | 8/2020 | Knob ...................... F16F 15/24 |

FOREIGN PATENT DOCUMENTS

| JP | 48-1041 Y1 | 1/1973 |
| JP | 2010-275993 A | 12/2010 |

(Continued)

OTHER PUBLICATIONS

International Search Report and Written Opinion Received for PCT/JP2022/019566, dated Jul. 26, 2022.

*Primary Examiner* — Jorge L Leon, Jr.
(74) *Attorney, Agent, or Firm* — Greer, Burns & Crain, Ltd

(57) ABSTRACT

An engine device for an unmanned flying apparatus that provides good weight balance for the flying apparatus; cancels the gyroscopic effect; and has auto rotating propellers.

The engine device includes a first cylinder and a second cylinder arranged horizontally and opposed to each other, and pistons within the cylinders advance and retract in opposite directions to each other; a first crankshaft and a second crankshaft arranged in the vertical direction, driven by the first cylinder and the second cylinder, respectively, and rotate in opposite directions; a first centrifugal clutch and a second centrifugal clutch rotate in opposite directions to each other; a final drive shaft transmitting rotational force to a gear mechanism comprising orthogonal transform gears, to rotate a propeller shaft; a one-way clutch arranged between
  the first crankshaft, the second crankshaft and
  the final drive shaft, and driven by both the first crankshaft and the second crankshaft.

3 Claims, 5 Drawing Sheets

(51) Int. Cl.
    *B64U 50/11*          (2023.01)
    *F01L 1/02*           (2006.01)
    *F01N 13/10*          (2010.01)
    *F02B 75/24*          (2006.01)
    *F01L 1/047*          (2006.01)

(52) U.S. Cl.
    CPC .............. *F01N 13/10* (2013.01); *F02B 75/24* (2013.01); *F01L 1/047* (2013.01); *F01N 2340/04* (2013.01); *F01N 2590/00* (2013.01)

(58) Field of Classification Search
    USPC ......................................... 60/323; 123/90.31
    See application file for complete search history.

(56) References Cited

FOREIGN PATENT DOCUMENTS

| | | |
|---|---|---|
| JP | 2016-166598 A | 9/2016 |
| JP | 2019-148186 A | 9/2019 |
| WO | 2019065848 A1 | 4/2019 |
| WO | 2021133283 A1 | 7/2021 |

\* cited by examiner

[Fig. 1]
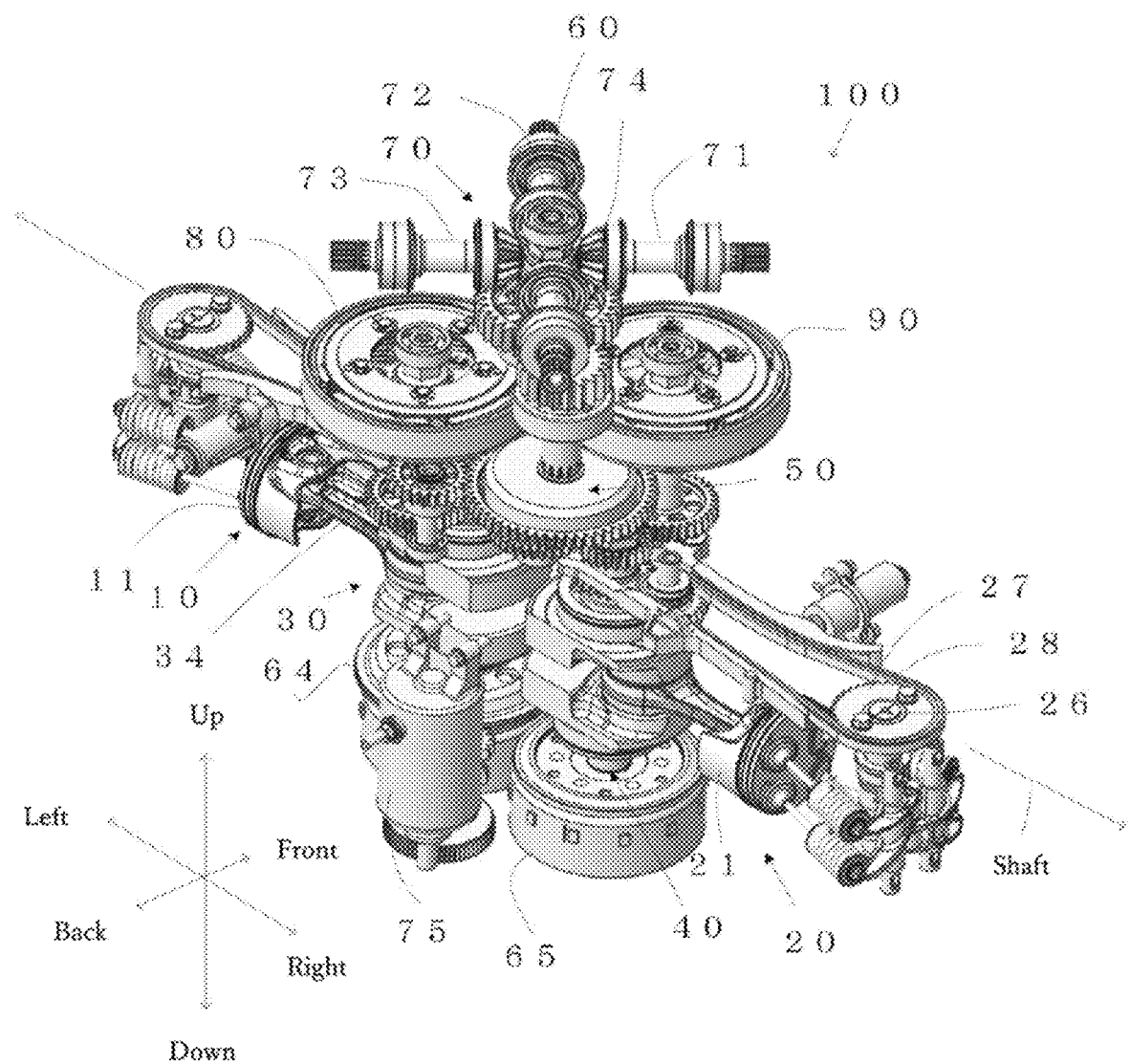

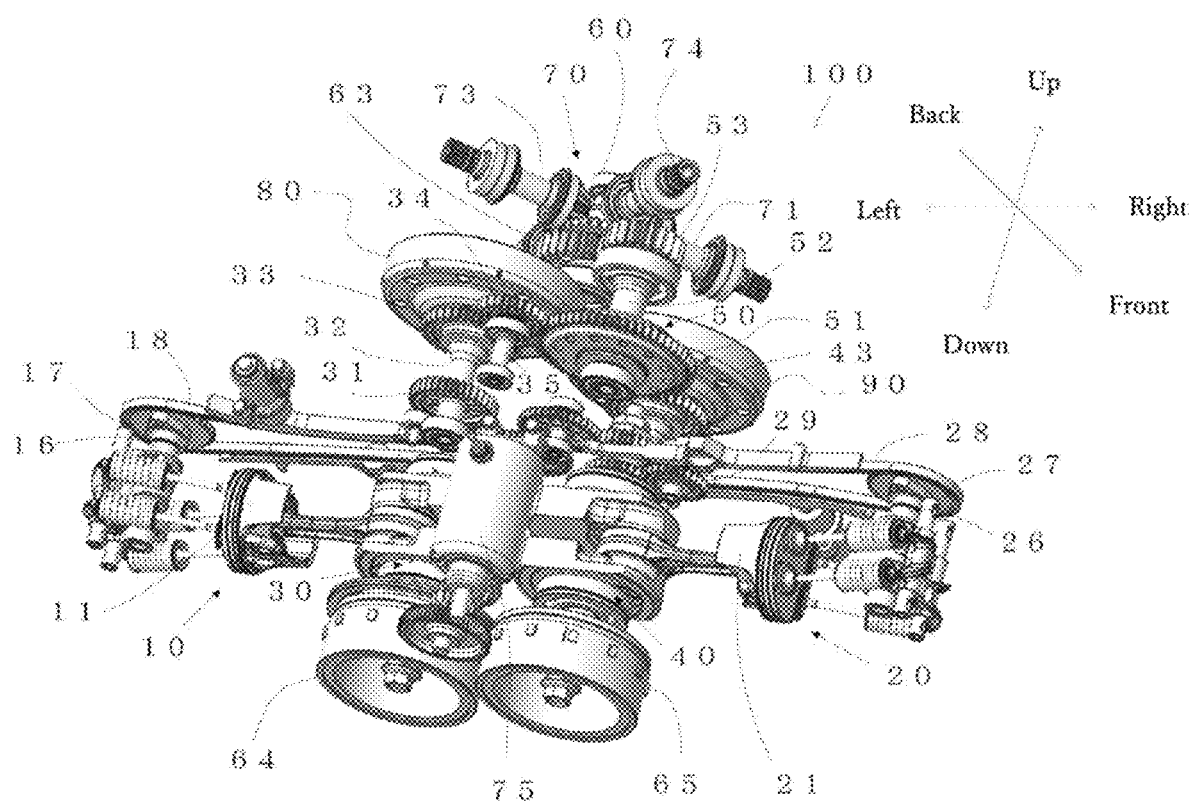
[Fig. 2]

[Fig. 3]
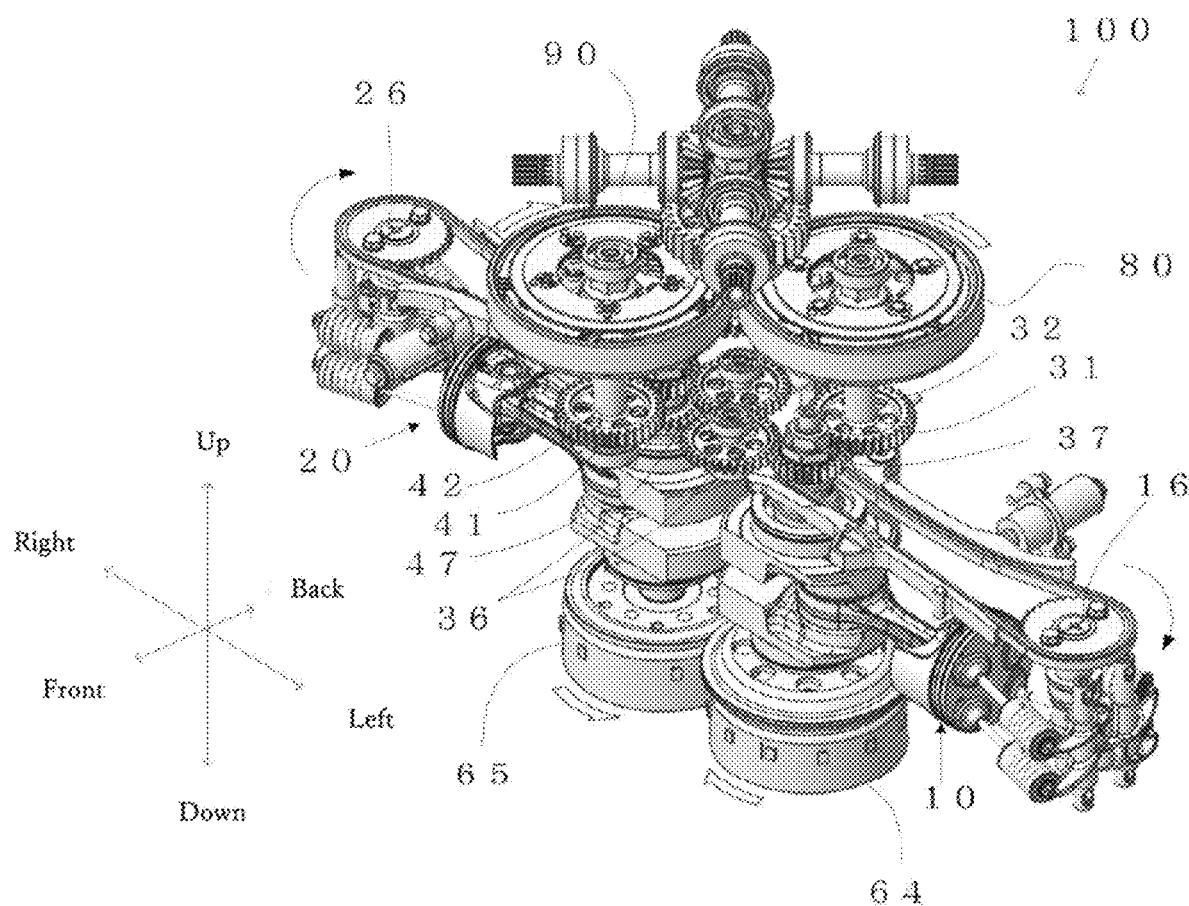

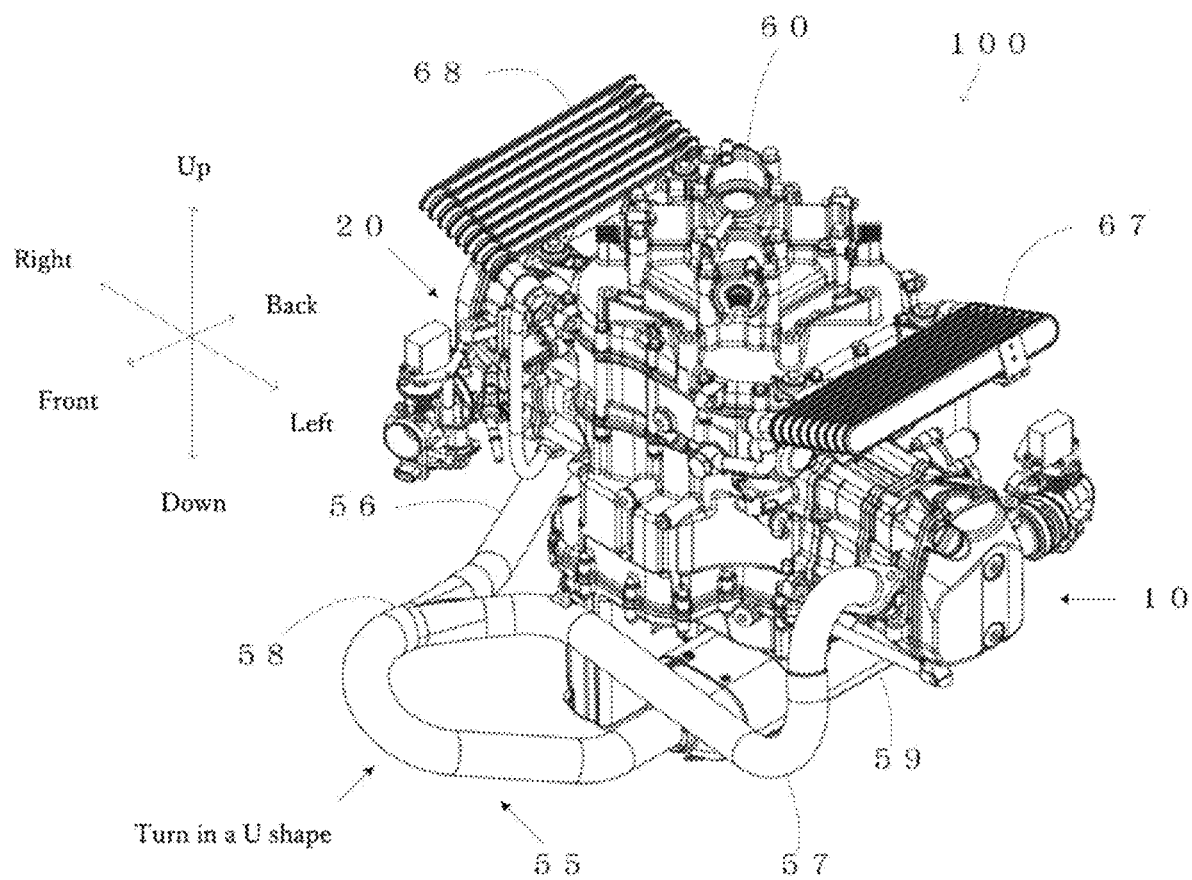
[Fig. 4]

[Fig. 5]
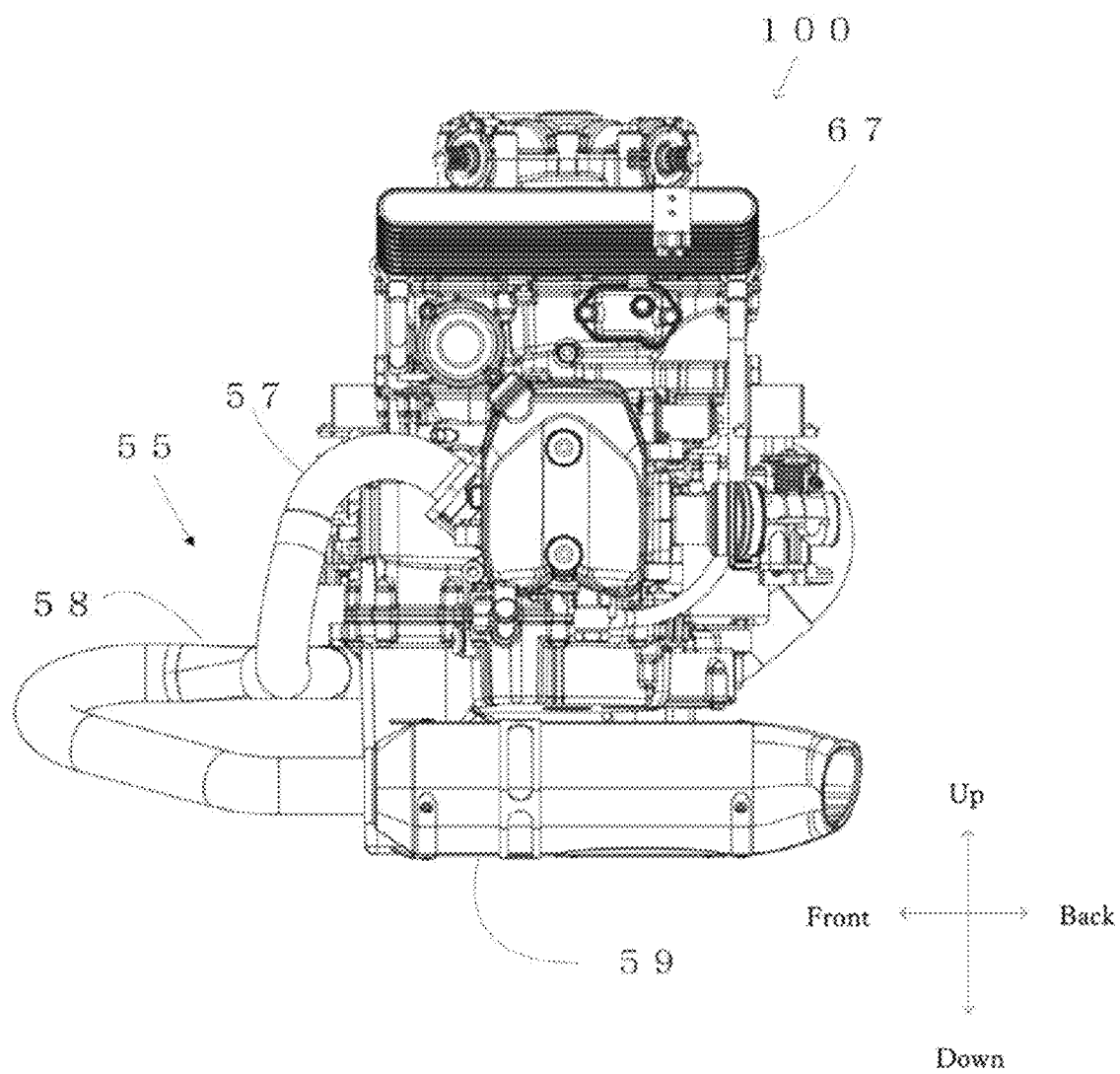

ENGINE DEVICE FOR UNMANNED FLYING APPARATUS

BACKGROUND

The present invention relates to an engine device for an unmanned flying apparatus. More precisely, an engine device for an unmanned flying apparatus with two centrifugal clutches attached corresponding to two crankshafts provided in a horizontally opposed engine for an unmanned flying apparatus.

A reciprocating engine has been used more often for an unmanned flying apparatus (a drone). An inline engine and a horizontally opposed engine are representatives of a reciprocating engine. A horizontally opposed engine has piston and cylinder blocks arranged on the left and right side of a crankshaft. A horizontally opposed engine has advantages such as less engine vibration and less length of the engine in the front-to-back direction, compared with an inline engine.

Patent Document 1 discloses an engine in which a first piston and a second piston that are arranged upright in vertical direction; and a first crankshaft and a second crankshaft corresponding to the first piston and the second piston, respectively, are arranged horizontally under the first piston and the second piston. The first crankshaft and the second crankshaft rotate in opposite directions to each other to cancel the gyroscopic effect of the flying apparatus.

The following points are required for a reciprocating engine in an unmanned flying apparatus with a plurality of propellers.
(1) Improvement of the weight balance of the flying apparatus. Concretely, the output shaft of the engine is located in the center of the flying apparatus, and the center of gravity of the engine coincides with the center of gravity of the flying apparatus.
(2) The gyroscopic effect of the rotating parts inside of an engine does not adversely affect controllability of a flying apparatus.
(3) A flying apparatus can land safely even if an engine stops due to trouble, that is, propellers can auto rotate by receiving air flow, even if the engine stops.

PRIOR ART DOCUMENTS

Patent Document

Patent Document 1
Japanese Unexamined Patent Application Publication No. 2019-148186

SUMMARY

The purpose of the present invention is to provide an engine device for an unmanned flying apparatus that
(1) has good weight balance for the flying apparatus;
(2) can cancel the gyroscopic effect that adversely affects controllability of the flying apparatus; and
(3) has propellers that can auto rotate even if the engine stops.

The engine device for an unmanned flying apparatus according to the present invention comprises: a first cylinder and a second cylinder arranged horizontally and opposed to each other on an axis in the left-to-right direction, and pistons within the cylinders advance and retract in opposite directions to each other; a first crankshaft and a second crankshaft arranged in the vertical direction perpendicular to the axis, driven by the first cylinder and the second cylinder, respectively, and rotate in opposite directions to each other; a first centrifugal clutch and a second centrifugal clutch arranged above the first crankshaft and the second crankshaft, and rotate in opposite directions to each other; a final drive shaft transmitting rotational force to a gear mechanism to rotate a propeller shaft; a one-way clutch arranged between
   (1) the first crankshaft and the second crankshaft and
   (2) the final drive shaft, and driven by both of the first crankshaft and the second crankshaft.

The engine device, wherein an exhaust pipe from the first cylinder and an exhaust pipe from the second cylinder are connected at the point of equal length, and then turned in a U shape and connected to a muffler arranged below the exhaust pipes.

The engine device, wherein a first camshaft and a second camshaft are provided in the first cylinder and the second cylinder respectively to control respective valves, and one of the camshafts is driven by the first crankshaft and the other is driven by the second crankshaft via an reversing gear; and the first camshaft and the second camshaft rotate in the same direction.

According to the engine device for an unmanned flying apparatus of the present invention,
(1) The first centrifugal clutch and the second centrifugal clutch are provided, and because the first centrifugal clutch and the second centrifugal clutch rotate in opposite directions to each other with a large momentum, the gyroscopic effect can be canceled and the attitude control of the flying apparatus becomes easy.
(2) Providing two centrifugal clutches can make the height of an engine device lower than providing one centrifugal clutch with large radius and height. Also, the first centrifugal clutch and the second centrifugal clutch can be arranged in symmetric positions near the center of the engine, and the center of gravity can be maintained in the center.
(3) Because a one-way clutch is provided, auto rotation becomes possible, that can reduce the risk of crash drastically. For example, the propeller side of the axis of the one-way clutch can keep rotating.
(4) Because
   (a) the first cylinder and the second cylinder are arranged horizontally and opposed to each other on an axis in the left-to-right direction and
   (b) pistons within the cylinders advance and retract in opposite directions to each other, the vibration of pistons is canceled, this makes an engine device with low vibration.
(5) Because the first crankshaft and the second crankshaft are arranged upright in the vertical direction, the length of the engine in the front-to-back direction can be reduced.

According to claim 2,
(1) the center of gravity of the engine can be maintained near its center because the muffler is arranged at the bottom of the engine;
(2) the engine device can be lightweight and compact because there is only one muffler;
(3) the exhaust pipe volume can be saved because the exhaust pipes are connected at the point of equal length and merged into one.

According to claim 3, because the first camshaft and the second camshaft rotate in the same direction, the control unit of the first cylinder, the second cylinder, pistons and valves can be common. Although the camshafts rotate in the same direction, the gyroscopic effect by this is very small and can be negligible. The advantageous effect of communalizing members is larger than the very small gyroscopic effect.

BRIEF DESCRIPTIONS OF THE DRAWINGS

FIG. 1 This figure is a perspective view of an engine device of an unmanned flying apparatus according to the present invention.

FIG. 2 This figure is a perspective view of an engine device of an unmanned flying apparatus according to the present invention.

FIG. 3 This figure shows rotation directions of main members of an engine device of an unmanned flying apparatus.

FIG. 4 This figure is an external view of an engine device of an unmanned flying apparatus including accessories.

FIG. 5 This figure is a left side view of the engine device of FIG. 4.

DETAILED DESCRIPTION

Hereinafter, the engine device of an unmanned flying apparatus of the present invention is explained in detail.

Embodiments

FIG. 1 is a perspective view of an engine device of an unmanned flying apparatus according to the present invention. This perspective view is seen diagonally downward from the upper right rear. The view is illustrated so that the outer cover is removed so that the inside can be seen. The engine device 100 is a two-cylinder engine, and a first cylinder and a second cylinder are arranged horizontally and opposed to each other on an axis in the left-to-right direction. A first piston 11 is equipped in the first cylinder and a second piston 21 is equipped in the second cylinder. As an example, the second camshaft is provided and rotated by a second gear 27 driven by a second belt 28 to control an exhaust valve and air intake valve.

As shown in FIG. 1, a first crankshaft 30 and a second crankshaft 40 are arranged upright in the vertical direction perpendicular to the axis. The first crankshaft 30 is driven by a first piston 11 of a first cylinder 10 and rotates. The second crankshaft 40 is driven by a second piston 21 of a second cylinder 20 and rotates. The first crankshaft 30 and the second crankshaft 40 rotate in opposite directions to each other, and can cancel the gyroscopic effect. A first generator 64 is provided under the first crankshaft 30, and a second generator 65 is provided under the second crankshaft 40. The first generator 64 and the second generator 65 generate electricity by rotation of the first crankshaft 30 and the second crankshaft 40, and supply power to an ignition system of the engine, a fuel feed system and a control unit of the unmanned flying apparatus, etc. A starter 75 is provided at the lower rear side of the engine.

A first centrifugal clutch 80 and a second centrifugal clutch 90 are arranged above the first crankshaft 30 and the second crankshaft 40, respectively. The rotational force of the first crankshaft 30 is transmitted to the first centrifugal clutch 80. The rotational force of the second crankshaft 40 is transmitted to the second centrifugal clutch 90. When the rotational speed of the first crankshaft 30 increases, centrifugal force acts on inside weight(s), and clutch plates of the first centrifugal clutch 80 are engaged, and the first centrifugal clutch 80 rotates its output gear projecting downward in FIG. 2. Similarly, the second centrifugal clutch 90 rotates its output gear projecting downward in FIG. 2, when the rotational speed of the second crankshaft 40 increases.

A one-way clutch 50 is arranged under the first centrifugal clutch 80 and the second centrifugal clutch 90. An outer gear of the one-way clutch 50 is driven by both the first centrifugal clutch 80 and the second centrifugal clutch 90. The first centrifugal clutch 80 and the second centrifugal clutch 90 rotate in opposite directions to each other. In this embodiment, the rotational direction of the output gear of the first centrifugal clutch 80 is reversed by a reversing gear 34, and the output gear drives the one-way clutch 50 via the reversing gear. The output gear of the second centrifugal clutch 90 drives the one-way clutch 50 directly. The output shaft of the one-way clutch 50 rotates in one direction by transmitting the rotational forces of the first centrifugal clutch 80, and the second centrifugal clutch 90 are transmitted to an output shaft of the one-way clutch 50 by a hook inside, and the output shaft rotates in one direction. The output shaft can rotate in one direction even if it is not driven by the hook, and acts as a so-called one-way clutch.

The output shaft of the one-way clutch 50 transmits its rotational force to a final drive shaft 60 via gears. A gear mechanism 70 comprising orthogonal transform gears is provided in the final drive shaft 60, and transmits rotational force to propeller shafts 71 to 74 in four directions.

FIG. 2 is a perspective view of an engine device of an unmanned flying apparatus 100 according to the present invention. This perspective view is seen diagonally upward from the lower right rear. Explanation will be made as a supplement to FIG. 1. The first cylinder 10 and the second cylinder 20 are arranged horizontally and opposed to each other. The first crankshaft 30 and the second crankshaft 40 are arranged in the vertical direction perpendicular to the line connecting the first cylinder 10 and the second cylinder 20.

As shown in FIG. 2, the first camshaft 16 is rotated by a first gear 17 driven by a first belt 18, and the first camshaft 16 controls an exhaust valve and air intake valve of the first cylinder 10. The first piston 11 is inside of the first cylinder, and is connected to its connecting rod, and rotates the first crankshaft 30. The second piston 21 is inside of the second cylinder, and is connected to its connecting rod, and rotates the second crankshaft 40. The second belt 28 of the second cylinder 20 is driven by a gear provided in the shaft of a reversing gear 29 to reverse the rotational direction of the second crankshaft 40. That is, the rotational direction of the second camshaft 26 is opposite to the rotational direction of the second crankshaft 40.

The part under the first centrifugal clutch 80 is configured as follows. A driven gear 31 is driven by the gear of the first crankshaft 30, and rotates the first centrifugal clutch shaft 32. When the rotational speed of the first centrifugal clutch shaft 32 increases, centrifugal force acts on weight(s) inside of the first centrifugal clutch 80 and clutch plates provided inside of the first centrifugal clutch 80 are engaged. The first centrifugal clutch output gear 33 under the first centrifugal clutch 80 is rotated by this. The rotational direction of the first centrifugal clutch output gear 33 is reversed by a reversing gear 34. The reversing gear 34 engages with a one-way clutch gear 51 of a one-way clutch 50, and rotates the one-way clutch 50. Accordingly, a one-way clutch shaft 52 rotates, and the rotational force is transmitted to a final drive shaft 60 by a drive gear 53 provided in the one-way clutch shaft 52 via a driven gear 63. The second centrifugal clutch 90 has similar configuration, and the output of the second centrifugal clutch 90 is shown in the second centrifugal clutch output gear 43. However, there is no reversing gear, and the second centrifugal clutch output gear 43 engages with the one-way clutch gear 51, and the rotational force is transmitted.

FIG. 3 shows rotation directions of main members of an engine device of an unmanned flying apparatus. This perspective view is seen diagonally downward from the upper right front. The rotational directions are defined as the first crankshaft 30 rotates clockwise, and the second crankshaft 40) rotates counterclockwise. From the arrangement of gears, the first centrifugal clutch 80 rotates counterclockwise, and the second centrifugal clutch 90 rotates clockwise. In either case, the direction of rotation is opposite to each other, and the gyroscopic effect can be canceled by this. Although the first camshaft 16 and the second camshaft 26 rotate in the same clockwise direction, the gyroscopic effect by this is very small and can be negligible. The advantageous effect of communalizing members is larger than the very small gyroscopic effect.

Referring to FIG. 3, the configuration under the first centrifugal clutch 80 is explained as follows. The driven gear 31 of the first centrifugal clutch 80 is driven by a drive gear 37 of the first crankshaft 30, and rotates the first centrifugal clutch shaft 32. When the first centrifugal clutch shaft 32 rotates, centrifugal force acts on weight(s) inside of the first centrifugal clutch 80, and inside clutch plates are engaged. By this, the first centrifugal clutch output gear 33 under the first centrifugal clutch 80 rotates (please refer to FIG. 2). Similarly, the driven gear 41 of the second centrifugal clutch 90 is driven by a drive gear 47 of the second crankshaft 40, and rotates the second centrifugal clutch shaft 42. When the second centrifugal clutch shaft 42 rotates, centrifugal force acts on weight(s) inside of the second centrifugal clutch 90, and inside clutch plates are engaged. By this, the second centrifugal clutch output gear 43 under the second centrifugal clutch 90 rotates (please refer to FIG. 2).

As shown in FIG. 3, two gears 36, with the same number of teeth are arranged between the first crankshaft 30 and the second crankshaft 40, and engage each other to rotate. Because one gear 36 is driven by the first crankshaft 30, and another gear 36 is driven by the second crankshaft 40, the rotation speeds of the first crankshaft 30 and the second crankshaft 40 are the same.

FIG. 4 is an external view of an engine device of an unmanned flying apparatus including accessories, and FIG. 5 is a left side view of the engine device of FIG. 4. As shown in FIG. 4, a first radiator or oil cooler 67 and a second radiator or oil cooler 68 are used for cooling of the first cylinder 10 and the second cylinder 20, respectively. Exhaust pipe 55 comprises a first exhaust pipe 56 and a second exhaust pipe 57 that are connected at the connecting part, and then turned in a U shape and connected to the muffler 59. The lengths of the first exhaust pipe 56 and the second exhaust pipe 57 to the connecting part are the same. As shown in FIG. 5, the muffler 59 is arranged in the center of the bottom of the engine, so the center of gravity of the flying apparatus can be maintained without shifting in the front-to-back direction.

INDUSTRIAL APPLICABILITY

According to the present invention, the first centrifugal clutch and the second centrifugal clutch, provided corresponding to the first camshaft and the second camshaft, respectively, rotate in opposite directions to each other, so the gyroscopic effect can be canceled and the attitude control of the flying apparatus becomes easy. The engine device of the present invention is suitable for an unmanned flying apparatus.

LIST OF REFERENCE NUMBERS

10: first cylinder
11: first piston
16: first camshaft
17: first gear
18: first belt
20: second cylinder
21: second piston
26: second camshaft
27: second gear
28 second belt
29: reversing gear
30 first crankshaft
31: driven gear
32: first centrifugal clutch shaft
33 first centrifugal clutch output gear
34: reversing gear
35 shaft
36: gear
37: drive gear
40: second crankshaft
41: driven gear
42: second centrifugal clutch shaft
43: second centrifugal clutch output gear
47: drive gear
50: one-way clutch
51: one-way clutch gear
52: one-way clutch output shaft
53: drive gear
55: exhaust pipe
56 first exhaust pipe
57: second exhaust pipe
58: connecting part
59: muffler
60: final drive shaft
63: driven gear
64: first generator
65: second generator
67: first radiator or oil cooler
68: second radiator or oil cooler
70: gear mechanism
71, 72, 73, 74: propeller shaft
75: starter
80: first centrifugal clutch
90: second centrifugal clutch
100: engine device for an unmanned flying apparatus

The invention claimed is:
1. An engine device for an unmanned flying apparatus, the engine device comprising:
a first cylinder and a second cylinder respectively including a first piston and a second piston, the first and second cylinders being horizontally opposed to each other along an axis extending in a left-to-right direction of the unmanned flying apparatus such that the first and second pistons are each configured to advance and retract in opposite directions relative to each other;
a first crankshaft and a second crankshaft respectively driven via the first piston and the second piston, the first and second crankshafts extending vertically between the first and second cylinders in a direction perpen- dicular to the axis such that the first and second crankshafts rotate in opposite directions relative to each other;

a first centrifugal clutch and a second centrifugal clutch respectively coupled to the first crankshaft and the second crankshaft at positions above the first and second crankshafts such that the first and second centrifugal clutches rotate in opposite directions relative to each other;

a one-way clutch coupled to the first and second centrifugal clutches so as to receive a combined rotational force from the first and second crankshafts; and a final drive shaft coupled to the one-way clutch so as to transmit the rotational force to a gear mechanism including a plurality of bevel gears each configured to rotate a propeller shaft.

2. The engine device according to claim 1, wherein a first exhaust pipe and a second exhaust pipe respectively extend from the first cylinder and the second cylinder so as to connect to each other at a point of equal length thereby forming a combined exhaust pipe which then turns in a U-shape and connects to a muffler arranged below the first and second exhaust pipes.

3. The engine device according to claim 1, further comprising a first camshaft and a second camshaft respectively associated with gas exchange valves of the first cylinder and gas exchange valves of the second cylinder, wherein the first camshaft is driven by the first crankshaft, and wherein the second camshaft is driven by the second crankshaft via a reversing gear such that the first camshaft and the second camshaft rotate in a same direction.

* * * * *